3,398,207
SELECTIVE ISOPROPYLATION OF
PSEUDOCUMENE
Walter A. Butte, Jr., West Chester, Pa., assignor to Sun
Oil Company, Philadelphia, Pa., a corporation of New
Jersey
No Drawing. Filed Dec. 1, 1966, Ser. No. 598,154
2 Claims. (Cl. 260—671)

ABSTRACT OF THE DISCLOSURE 1-isopropyl-2,4,5-trimethylbenzene is produced by reacting pseudocumene with propylene in the presence of $AlCl_3$—$CH_3NO_2$—$(CH_3)_2CHX$, wherein X is chlorine or bromine.

Background of the invention

This invention pertains to the isopropylation of 1,2,4-trimethylbenzene (pseudocumene) to produce 1-isopropyl-2,4,5-trimethylbenzene selectively in remarkably high yield.

It is known to react pseudocumene with propylene in the presence of a catalytic amount of moist $AlCl_3$ to produce 1-isopropyl-2,4,5-trimethylbenzene. This is disclosed in prior U.S. Patent 3,132,189.

It also is known to react pseudocumene with propylene in the presence of a catalytic amount of $AlCl_3$—$CH_3NO_2$ complex to produce 1-isopropyl-2,4,5-trimethylbenzene. See Olah et al., J. Am. Chem. Soc., 86, 1046 (1964).

Summary of the invention

The present invention resides in the production of 1-isopropyl-2,4,5-trimethylbenzene by reacting pseudocumene with propylene in the presence of a catalyst complex having the formula $AlCl_3$—$CH_3NO_2$—$(CH_3)_2CHX$, wherein X is chlorine or bromine, to selectively produce the foregoing desired product in surprisingly higher yield than that obtained by the processes of the above-mentioned prior art.

The catalyst system results from the admixing of $AlCl_3$ with $Me_2CHX$, e.g., in approximately equimolar amounts, and with $CH_3NO_2$, e.g., in molar excess.

The catalyst complex may be pre-formed by combining the three ingredients in any desired order, or it may be formed in situ in the presence of pseudocumene to be reacted, the three catalyst ingredients again being combined in any desired order.

Description of the preferred embodiments

In a typical run in accordance with the invention, pseudocumene, diluent if any, and pre-formed catalyst or catalyst components, are charged to a pressure vessel which thereafter is kept at operating temperature. Propylene is added in a continuous manner so that it is replenished as it reacts, e.g., by maintaining a constant pressure. When the reaction has run a desired course, or subsides, excess propylene is vented from the reactor. The reaction mass is then removed, and worked up, e.g., by distillation to recover the desired product, and other products formed.

While reaction conditions of temperature, pressure and concentration of pseudocumene in the reaction zone may vary over a wide range, temperature conditions are usually held between 20° C. and 120° C., and preferably between 20° C. and 100° C., and propylene pressure conditions usually between a single and several score atmospheres, e.g., 1–500 p.s.i.g., and preferably between 1 and 100 p.s.i.g.

Ambient conditions, e.g., starting with room temperature and atmospheric pressure and allowing temperature in an open system, or both temperature and pressure in a closed system, to seek their levels, the reaction being exothermic, are quite satisfactory.

As solvent for the reaction mixture nitromethane in excess of that required to form the catalyst complex can be used. In addition or alternatively, an excess of pseudocumene can be utilized as solvent.

The following is given by way of illustration.

EXAMPLE

A vessel vented to the atmosphere was charged with a solution of 1.0 gram of $AlCl_3$ (.0075 mole) in 10 milliliters of nitromethane, 1 milliliter of 2-chloropropane (.011 mole), and 25 milliliters of 1,2,4-trimethylbenzene (pseudocumene). Propylene was bubbled through the resulting mixture for a period of 2 hours. A rapid exothermic reaction ensued during which no attempt was made to control temperature. After the expiration of the 2-hour period, the reaction mass was washed with water, and then subjected to distillation to yield 18 milliliters of monoalkylated product. On the basis of infrared spectra and gas chromatographic analysis, this monoalkylate contained 68% of 1-isopropyl-2,4,5-trimethylbenzene, the remainder being the 1,2,3,4- and 1,2,3,5-isomers.

As is well known, 1,2,4,5-tetraalkylbenzenes are useful as intermediates for the preparation of pyromellitic dianhydride, which in turn can be employed in the synthesis of plasticizers, resins and polymeric films and fiber.

I claim:
1. Method of preparing 1-isopropyl-2,4,5-trimethylbenzene which comprises reacting pseudocumene with propylene in the presence of a catalyst complex comprising $AlCl_3$—$CH_3NO_2$—$(CH_3)_2CHX$, wherein X is chlorine or bromine.
2. Method of preparing 1-isopropyl-2,4,5-trimethylbenzene in accordance with claim 1 which comprises admixing pseudocumene, $AlCl_3$, $CH_3NO_2$ and $(CH_3)_2CHCl$, and contacting the foregoing admixture with propylene.

References Cited

UNITED STATES PATENTS 2,302,721  11/1942  Schmerling.
2,756,265  7/1956  Hollyday.

FOREIGN PATENTS 782,084  8/1957  Great Britain.

DELBERT E. GANTZ, Primary Examiner.
C. R. DAVIS, Assistant Examiner.